US010979690B1

(12) United States Patent
Beeler et al.

(10) Patent No.: US 10,979,690 B1
(45) Date of Patent: Apr. 13, 2021

(54) SYSTEMS AND METHODS FOR USING DEPTH INFORMATION TO EXTRAPOLATE TWO-DIMENSIONAL IMAGES

(71) Applicant: Facebook Technologies, LLC, Menlo Park, CA (US)

(72) Inventors: Dean Joseph Beeler, San Francisco, CA (US); Paul Louis Pedriana, Castro Valley, CA (US); Edward Anthony Hutchins, Mountain View, CA (US); Volga Aksoy, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/783,190

(22) Filed: Feb. 6, 2020

Related U.S. Application Data

(63) Continuation of application No. 16/053,741, filed on Aug. 2, 2018, now Pat. No. 10,595,000.

(51) Int. Cl.
*H04N 13/139* (2018.01)
*H04N 13/366* (2018.01)
*H04N 13/00* (2018.01)

(52) U.S. Cl.
CPC ......... *H04N 13/139* (2018.05); *H04N 13/366* (2018.05); *H04N 2013/0085* (2013.01); *H04N 2213/003* (2013.01)

(58) Field of Classification Search
None
See application file for complete search history.

(56) References Cited

U.S. PATENT DOCUMENTS

| 10,595,000 | B1 | 3/2020 | Beeler et al. |
| 2015/0092856 | A1 | 4/2015 | Mammou et al. |
| 2017/0018056 | A1 | 1/2017 | Holzer et al. |
| 2019/0080505 | A1 | 3/2019 | Yeung et al. |
| 2019/0215532 | A1 | 7/2019 | He et al. |
| 2019/0246161 | A1 | 8/2019 | Lim et al. |

FOREIGN PATENT DOCUMENTS

| EP | 2 058 760 A1 | 5/2009 |
| WO | 2006/011153 A2 | 2/2006 |
| WO | 2020/028690 A1 | 2/2020 |

OTHER PUBLICATIONS

Notice of Allowance received for U.S. Appl. No. 16/053,741 dated Nov. 8, 2019, 27 pages.
International Search Report and Written Opinion received for PCT Application Serial No. PCT/US2019/044708 dated Sep. 17, 2019, 9 pages.

*Primary Examiner* — Vu Nguyen
(74) *Attorney, Agent, or Firm* — FisherBroyles, LLP

(57) ABSTRACT

The disclosed computer-implemented method may include (1) receiving a first 2D frame depicting an evolving 3D scene and elements in the evolving 3D scene, (2) receiving a second 2D frame depicting the evolving 3D scene and the elements, (3) deriving 2D motion vectors from the first 2D frame and the second 2D frame that each include an estimated offset from coordinates of an element in the first 2D frame to coordinates of the element in the second 2D frame, (4) receiving depth information for the evolving 3D scene, (5) using the 2D motion vectors and the depth information to extrapolate a synthetic 2D frame, and (6) displaying the synthetic 2D frame to a user. Various other methods, systems, and computer-readable media are also disclosed.

20 Claims, 15 Drawing Sheets

SYSTEMS AND METHODS FOR USING DEPTH INFORMATION TO EXTRAPOLATE TWO-DIMENSIONAL IMAGES

CROSS REFERENCE TO RELATED APPLICATIONS

This application is a continuation U.S. patent application Ser. No. 16/053,741, filed 2 Aug. 2018, the disclosure of which is incorporated, in its entirety, by this reference.

BACKGROUND

Virtual-reality (VR) and augmented-reality (AR) headsets are gaining in popularity for use in a growing number of activities. Such headsets may integrate visual information into a user's field of view to enhance their surroundings or allow them to step into immersive three-dimensional (3D) virtual environments. While VR and AR headsets are often utilized for gaming and other entertainment purposes, they are also commonly employed for purposes outside of recreation—for example, governments may use them for military training simulations, doctors may use them to practice surgery, and engineers may use them as visualization aids. VR and AR systems are also increasingly recognized for their utility in facilitating inter-personal interactions between individuals in a variety of contexts.

Rendering convincing, life-like VR or AR environments at a rate fast enough to create a sense of presence may be demanding on hardware resources. Typically, VR and AR hardware needs to be compact, power efficient, but at the same time very capable. For VR or AR applications, frames (or still images) are generally generated according to a user's movement, and slow frame rates may be noticed as stutter or flicker. As a result, many VR or AR applications are ideally viewed at high frame rates (e.g., greater than 90 frames per second) to produce stutter-free and flicker-free visuals. For this reason, VR and AR applications often come with a set of recommended hardware specifications that may be suggested to ideally view the VR or AR applications. Unfortunately, current VR and AR systems that meet these recommended hardware specifications and are capable of high frame rates may not be accessible to or affordable for many people and/or organizations. The instant disclosure, therefore, identifies and addresses a need for systems and methods that enable VR or AR applications, that are ideally viewed at high frame rates, to be viewed at lower frame rates, which may allow users to view these applications on more affordable minimum-specification hardware and systems.

SUMMARY

As will be described in greater detail below, the instant disclosure describes systems and methods for using depth information to extrapolate two-dimensional (2D) images. In one example, a computer-implemented method for using depth information to extrapolate 2D images may include (1) receiving a first 2D frame depicting an evolving 3D scene and elements in the evolving 3D scene, (2) receiving a second 2D frame depicting the evolving 3D scene and the elements, (3) deriving 2D motion vectors from the first 2D frame and the second 2D frame that each include an estimated offset from coordinates of an element in the first 2D frame to coordinates of the element in the second 2D frame, (4) receiving depth information for the evolving 3D scene, (5) using the 2D motion vectors and the depth information to extrapolate a synthetic 2D frame, and (6) displaying the synthetic 2D frame to a user.

In some examples, the first 2D frame and the second 2D frame may be sequentially rendered from the evolving 3D scene at half a desired frame rate, the first 2D frame and the second 2D frame may be sequentially displayed to the user at half the desired frame rate, and the step of displaying the synthetic 2D frame may include displaying the synthetic 2D frame at the desired frame rate. In other examples, the first 2D frame, the second 2D frame, and a third 2D frame may be sequentially rendered from the evolving 3D scene; the first 2D frame and the second 2D frame may be sequentially displayed to the user at a desired frame rate; and the step of displaying the synthetic 2D frame may include (1) determining that the third 2D frame failed to render in time to be displayed to the user at the desired frame rate and (2) displaying, at the desired frame rate, the synthetic 2D frame in place of the third 2D frame.

In some examples, the step of using the 2D motion vectors and the depth information to extrapolate the synthetic 2D frame may include removing noise from the 2D motion vectors by applying a weighted filter to the 2D motion vectors, and the depth information may be used to derive weights of the weighted filter. In at least one example, the weighted filter may be a center-weighted median filter. In some examples, the step of using the 2D motion vectors and the depth information to extrapolate the synthetic 2D frame may include (1) using the depth information to convert the 2D motion vectors into 3D motion vectors and (2) using the 3D motion vectors to extrapolate the synthetic 2D frame.

In some examples, the step of deriving the 2D motion vectors from the first 2D frame and the second 2D frame may include (1) sending, as input to a hardware motion estimator, the first 2D frame and the second 2D frame and (2) receiving, as output from the hardware motion estimator, the 2D motion vectors. In some examples, the first 2D frame and the second 2D frame may be received from a VR application or an AR application. In some examples, the step of using the 2D motion vectors and the depth information to extrapolate the synthetic 2D frame may include deriving the synthetic 2D frame from the second 2D frame by warping the second 2D frame based at least in part on the 2D motion vectors and the depth information. In some examples the computer-implemented method may further include tracking the user's translational motion in the physical world and using the depth information to reproject, before deriving the plurality of two-dimensional motion vectors, pixel elements of the second two-dimensional frame to account for the user's translational motion.

In addition, a corresponding system for using depth information to extrapolate 2D images may include several modules stored in memory, including (1) a frame-receiving module that receives (a) a first 2D frame depicting an evolving 3D scene and (b) a second 2D frame depicting the evolving 3D scene, (2) a deriving module that derives 2D motion vectors from the first 2D frame and the second 2D frame that each include an estimated offset from coordinates of an element in the first 2D frame to coordinates of the element in the second 2D frame, (3) a depth-information receiving module that receives depth information for the evolving 3D scene, (4) an extrapolating module that uses the 2D motion vectors and the depth information to extrapolate a synthetic 2D frame, and (5) a displaying module that displays the synthetic 2D frame to a user. The system may further include at least one processor that executes the frame-receiving module, the deriving module, the depth-information receiving module, the extrapolating module, and the displaying module.

In some examples, the first 2D frame and the second 2D frame may be sequentially rendered from the evolving 3D scene at half a desired frame rate, the first 2D frame and the second 2D frame may be sequentially displayed to the user at half the desired frame rate, and the displaying module may display the synthetic 2D frame at the desired frame rate. In other examples, the first 2D frame, the second 2D frame, and a third 2D frame may be sequentially rendered from the evolving 3D scene; the displaying module may sequentially display the first 2D frame and the second 2D frame to the user at a desired frame rate; and the displaying module may display the synthetic 2D frame by (1) determining that the third 2D frame failed to render in time to be displayed to the user at the desired frame rate and (2) displaying, at the desired frame rate, the synthetic 2D frame in place of the third 2D frame.

In some examples, the extrapolating module may use the 2D motion vectors and the depth information to extrapolate the synthetic 2D frame by removing noise from the 2D motion vectors by applying a weighted filter to the 2D motion vectors, and the depth information may be used to derive weights of the weighted filter. In at least one example, the weighted filter may be a center-weighted median filter. In some examples, the extrapolating module may use the 2D motion vectors and the depth information to extrapolate the synthetic 2D frame by (1) using the depth information to convert the 2D motion vectors into 3D motion vectors and (2) extrapolating the synthetic 2D frame using the 3D motion vectors.

In some examples, the deriving module may derive the 2D motion vectors from the first 2D frame and the second 2D frame by (1) sending, as input to a hardware motion estimator, the first 2D frame and the second 2D frame and (2) receiving, as output from the hardware motion estimator, the 2D motion vectors. In some examples, the frame-receiving module may receive the first 2D frame and the second 2D frame from a VR application or an AR application. In some examples, the extrapolating module may use the 2D motion vectors and the depth information to extrapolate the synthetic 2D frame from the second 2D frame by warping the second 2D frame based at least in part on the 2D motion vectors and the depth information.

In some examples, the above-described method may be encoded as computer-readable instructions on a computer-readable medium. For example, a computer-readable medium may include one or more computer-executable instructions that, when executed by at least one processor of a computing device, may cause the computing device to (1) receive a first 2D frame depicting an evolving 3D scene and elements in the evolving 3D scene, (2) receive a second 2D frame depicting the evolving 3D scene and the elements, (3) derive 2D motion vectors from the first 2D frame and the second 2D frame that each include an estimated offset from coordinates of an element in the first 2D frame to coordinates of the element in the second 2D frame, (4) receive depth information for the evolving 3D scene, (5) use the 2D motion vectors and the depth information to extrapolate a synthetic 2D frame, and (6) display the synthetic 2D frame to a user. In some examples, the first 2D frame and the second 2D frame may be sequentially rendered from the evolving 3D scene at half a desired frame rate, the first 2D frame and the second 2D frame may be sequentially displayed to the user at half the desired frame rate, and the computer-executable instructions may further cause the computing device to display the synthetic 2D frame at the desired frame rate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
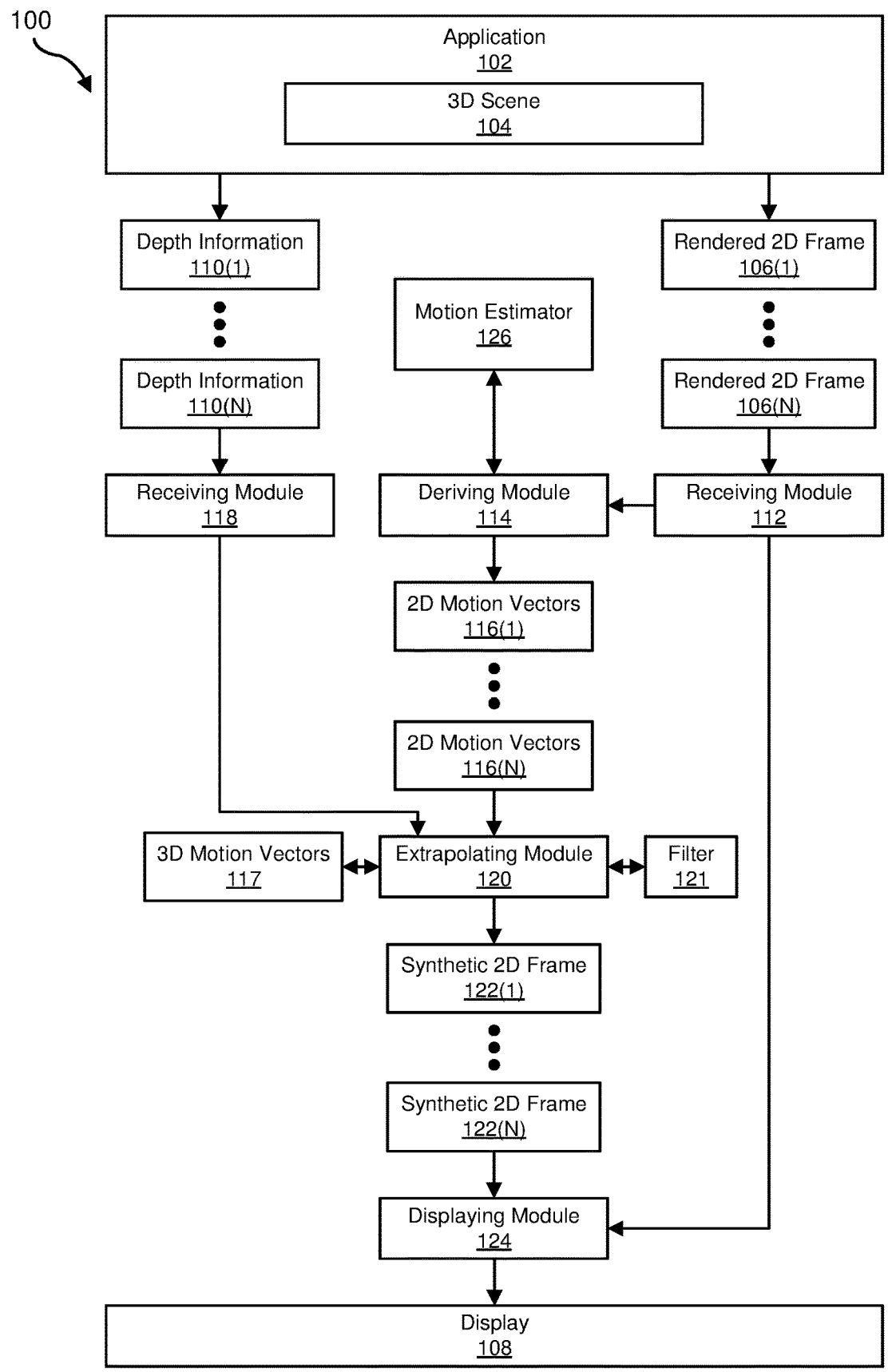
FIG. 1 is a block diagram of an exemplary display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a frame-rate smoothing technique that uses depth information to extrapolate synthetic 2D frames from a sequence of rendered 2D frames. As will be explained in greater detail below, embodiments of the instant disclosure may use depth information from an evolving 3D scene and estimations of motion from 2D frames rendered from the 3D scene to extrapolate supplemental synthetic 2D frames. In some examples, the systems and methods described herein may display these supplemental synthetic 2D frames whenever a VR or AR application renders a 3D scene at a frame rate that is lower than a display's desired or optimal frame rate, which may ensure that VR or AR experiences remain smooth and enjoyable for users. Additionally or alternatively, the systems and methods described herein may display supplemental synthetic 2D frames for a VR or AR application running on hardware that is unable to render 2D frames at a display's desired or optimal frame rate, which may improve VR or AR experiences on lower performance hardware that was previously unable to drive enjoyable VR or AR experiences. In at least one example, by displaying a synthetic 2D frame for every 2D frame rendered by a VR or AR application, the systems and methods described herein may enable the VR or AR application to render 2D frames at half of a display's desired or optimal frame rate, which may halve the central processing unit (CPU) and/or the graphical processing unit (GPU) time required to produce 2D frames from a 3D scene.

Figure 6:
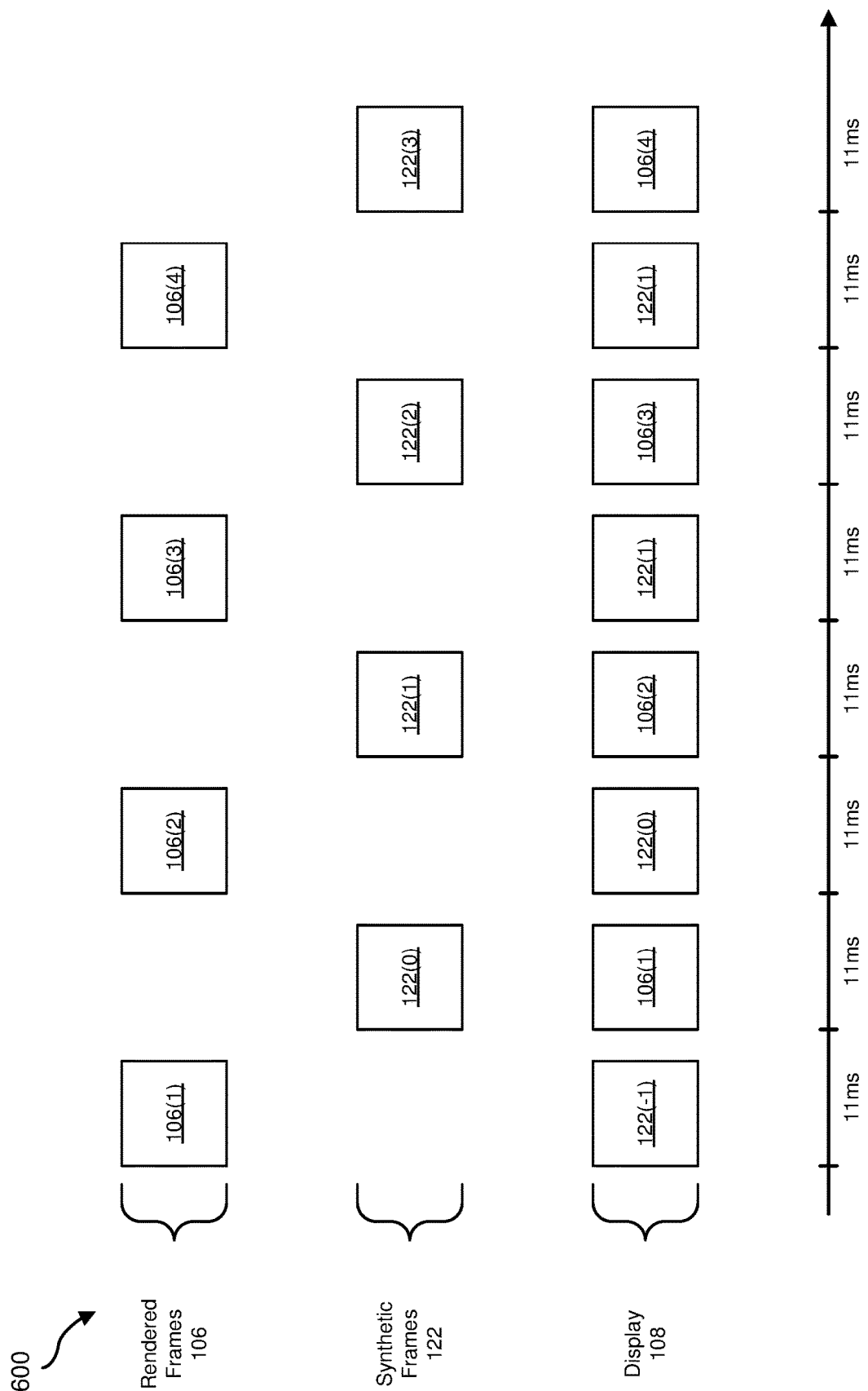
FIG. 6 is a timing diagram illustrating exemplary frame rates in accordance with some embodiments.
Figure 7:
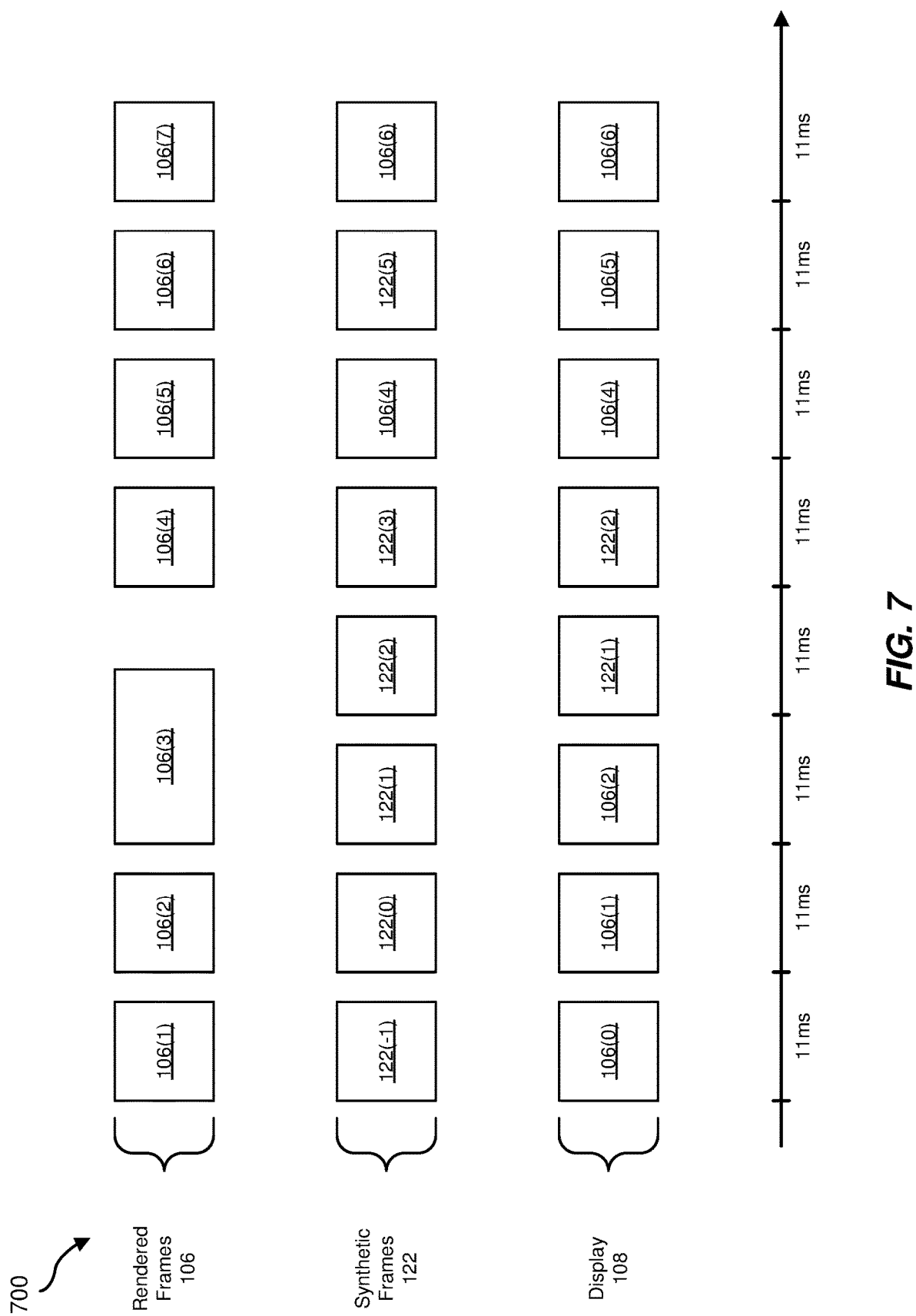
FIG. 7 is a timing diagram illustrating exemplary frame rates in accordance with some embodiments.

The following will provide, with reference to FIG. 1, detailed descriptions of an example system for extrapolating 2D frames using depth information. Detailed descriptions of an example evolving 3D scene will be provided in connection with FIGS. 2-5. FIGS. 6 and 7 will provide detailed descriptions of example frame rates for displaying 2D frames. Additionally, detailed descriptions of example 2D frames, depth information, and motion vectors will be provided in connection with FIGS. 8-10 and 12-15. Also, detailed descriptions of a method for using depth information to extrapolate 2D frames will be provided in connection with FIG. 11.

FIG. 1 is a block diagram of an exemplary system 100 for displaying a sequence of 2D frames depicting an evolving 3D scene to a user. As illustrated in this figure, system 100 may include an application 102 that manages an evolving 3D scene 104. In some examples, application 102 may represent a VR application or an AR application that manages an evolving interactive 3D environment that is viewed by a user via a head-mounted display system. In some examples, application 102 may use a CPU and/or a GPU to manage or render 3D scene 104. Display 108 may represent any suitable display screen or combination of display screens, such as a liquid crystal display (LCD) screen, an organic light-emitting diode (OLED) screen (e.g., an active-matrix OLED screen), a plasma screen, and/or any other suitable display screen. In some examples (e.g., when incorporated in a head-mounted display system), display 108 may include a left side that is visible to a user's left eye and a right side that is visible to a user's right eye. In some examples, the left and right sides of display 108 may be used to display a stereoscopic pair of separate images, depicting left-eye and right-eye views of 3D scene 104, as a single 3D image.

In some embodiments, the term "three-dimensional scene" may refer to any 3D representation or model of geometric data that may be used for performing calculations and/or rendering 2D images. In some examples, the term "three-dimensional scene" may refer to a 3D representation or model of a VR or AR interactive environment. In some examples, a three-dimensional scene may include 3D objects or elements that may be positioned within a 3D space. A 3D scene may evolve over time such that 3D objects or elements in the 3D scene move relative to each other and/or a user or camera perspective.

Figure 2:
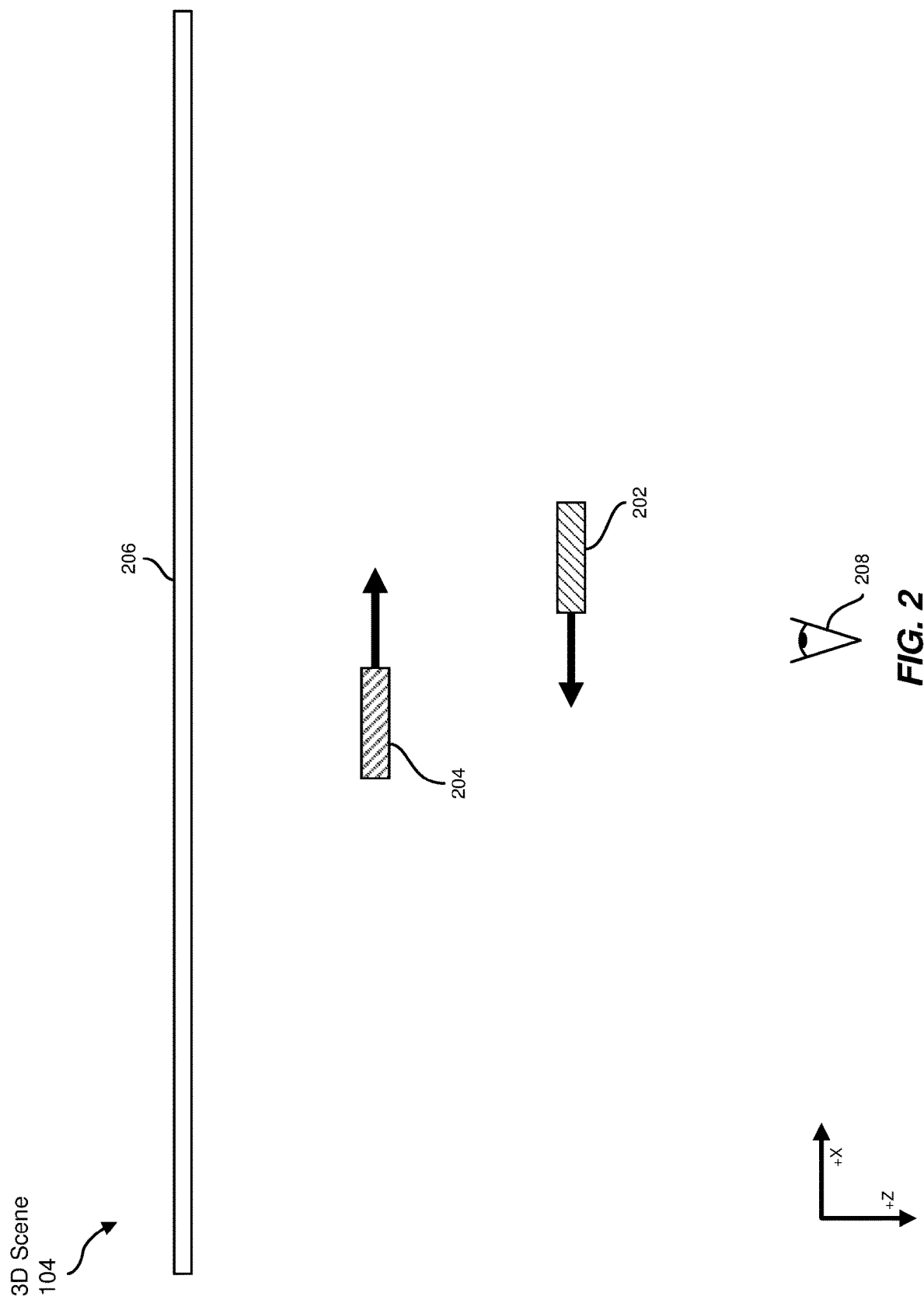
FIG. 2 is a top-down view of an exemplary 3D scene in accordance with some embodiments.
Figure 3:
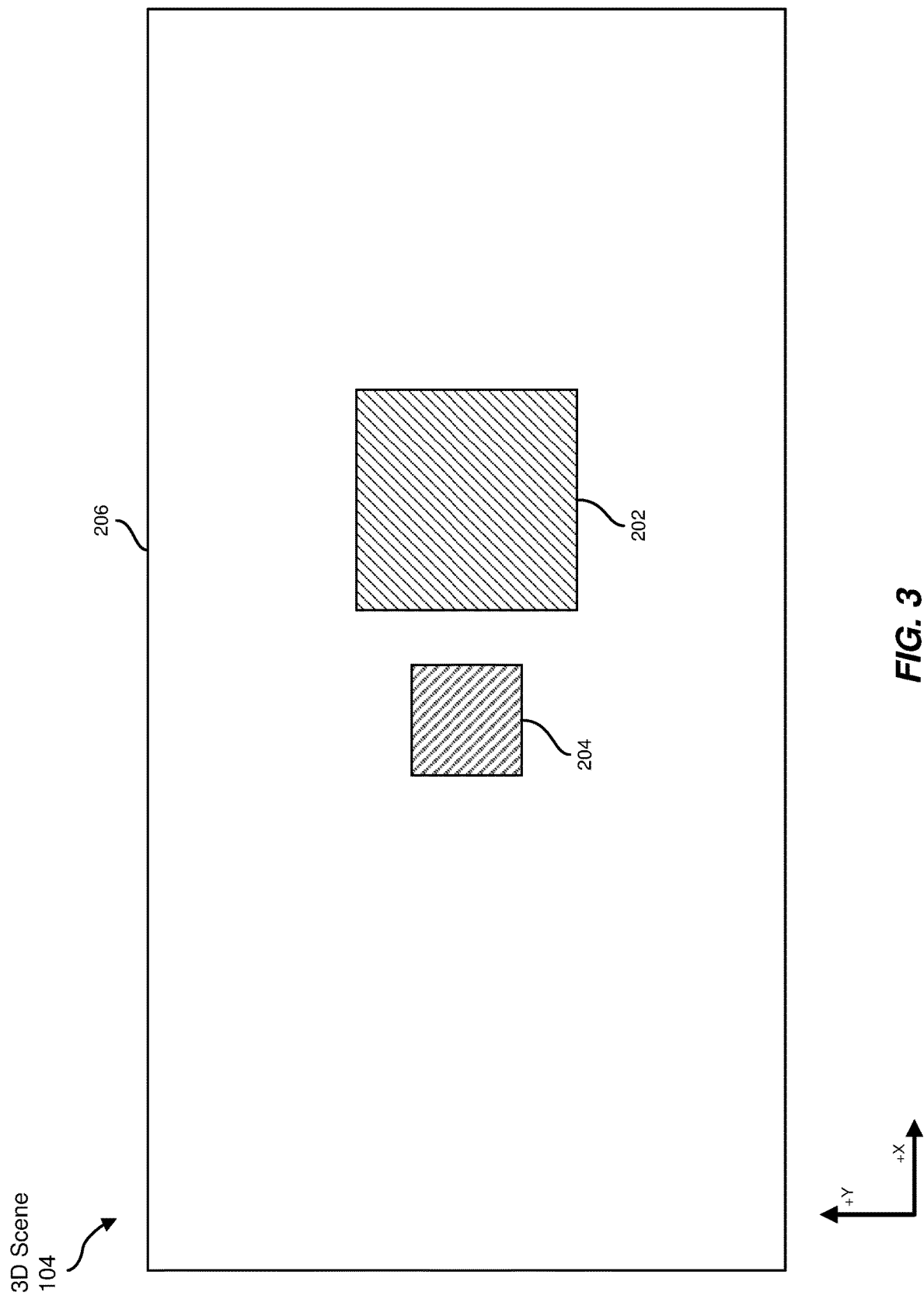
FIG. 3 is a front view of the exemplary 3D scene illustrated in FIG. 2 in accordance with some embodiments.
Figure 4:
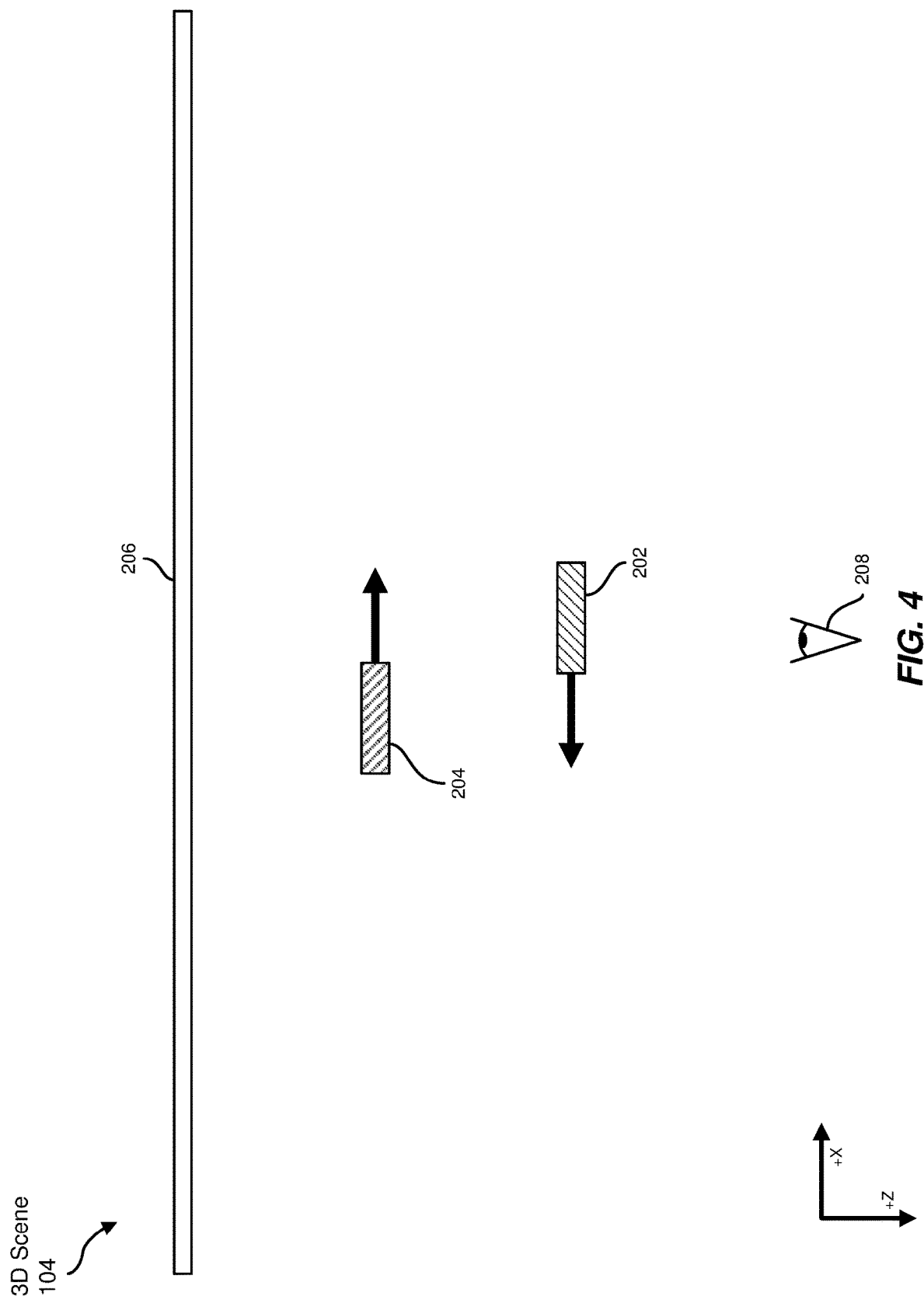
FIG. 4 is another top-down view of the exemplary 3D scene illustrated in FIG. 2 in accordance with some embodiments.
Figure 5:
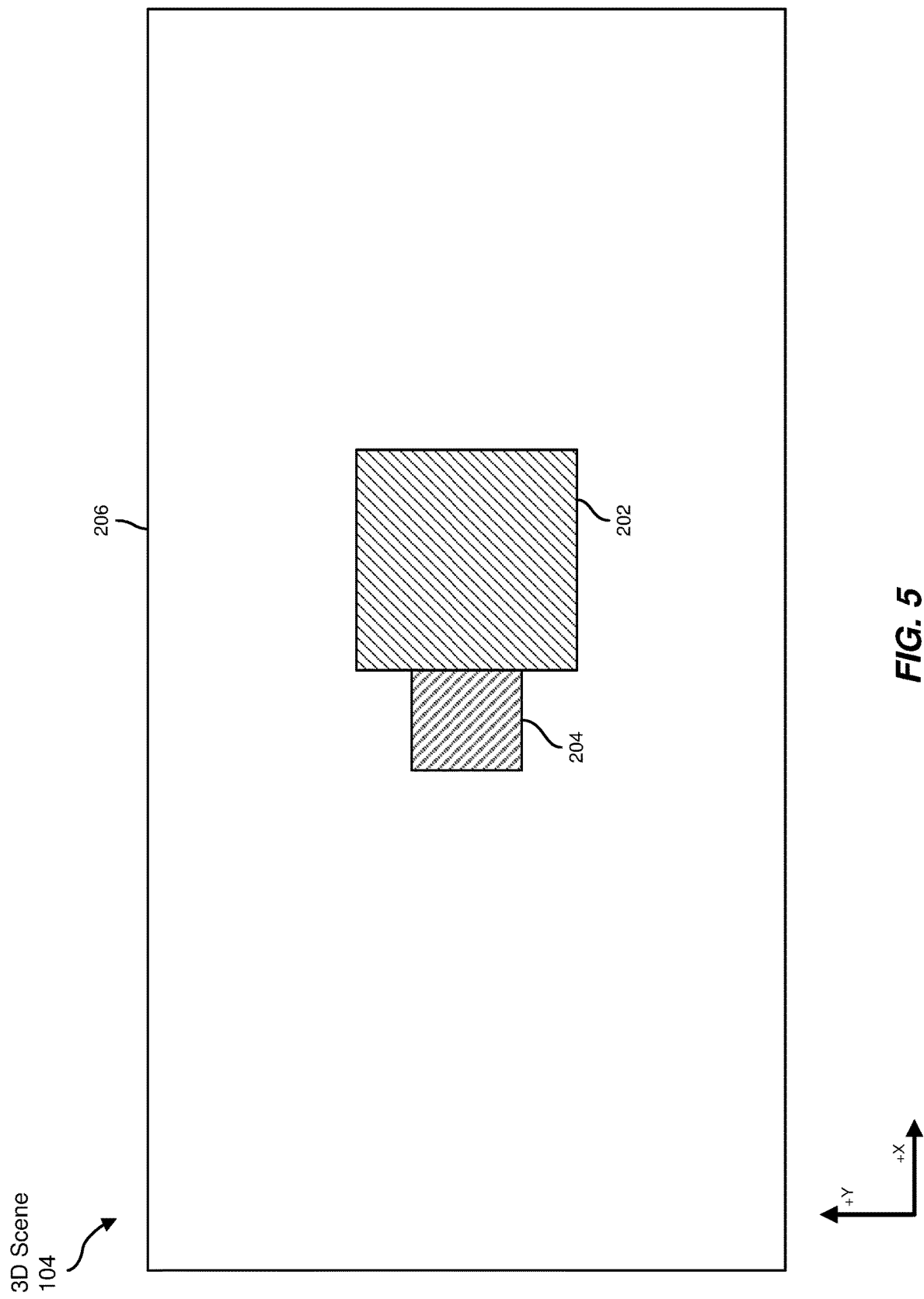
FIG. 5 is another front view of the exemplary 3D scene illustrated in FIG. 2 in accordance with some embodiments.

FIGS. 2-5 illustrate exemplary 3D scene 104. As shown in these figures, 3D scene 104 may include a foreground object 202, a middle-ground object 204, and a background object 206. In this example, foreground object 202 may be moving from right to left (i.e., in a negative X direction) relative to perspective 208, middle-ground object 204 may be moving from left to right (i.e., in a positive X direction) relative to perspective 208, and background object 206 may be stationary relative to perspective 208. FIGS. 2 and 3 respectively illustrate a top-down view and a front view of 3D scene 104 at a first time when, from perspective 208, foreground object 202 and middle-ground object 204 overlap background object 206 but not each other. FIGS. 4 and 5 respectively illustrate a top-down view and a front view of 3D scene 104 at a subsequent time when, from perspective 208, foreground object 202 and middle-ground object 204 overlap background object 206 and foreground object 202 overlaps middle-ground object 204.

Returning to FIG. 1, application 102 may render 3D scene 104 to a sequence of 2D frames 106(1)-(N) for display to a user via display 108. In examples where application 102 is a VR or AR application, application 102 may need to render 3D scene 104 twice, once with a left-eye perspective and once with a right-eye perspective. In such examples, 2D frames 106(1)-(N) may represent 2D frames rendered for either the left-eye perspective or the right-eye perspective.

In some examples, application 102 may sequentially render 3D scene 104 to 2D frames at less than a desired frame rate (e.g., less than an optimal frame rate of display 108 or less than an optimal frame rate for viewing VR or AR environments). In some situations, application 102 may be unable to sequentially render 3D scene 104 to 2D frames 106(1)-(N) at a desired or optimal frame rate because of a lack of adequate hardware resources. In these situations, as will be explained below, the systems described herein may supplement 2D frames 106(1)-(N) with synthetic 2D frames 122(1)-(N) in order to display 2D frames (i.e., rendered and synthetic 2D frames) via display 108 at a desired or optimal frame rate.

FIG. 6 shows an example timing diagram 600 illustrating an exemplary frame rate (i.e., 45 frames per second) by which application 102 may render 2D frames 106(1)-(N) from 3D scene 104. In this example, display 108 may be capable of displaying 2D frames at 90 frames per second (i.e., once every 11 milliseconds (ms)), but display 108 may only be able to display 2D frames 106(1)-(N) at 45 frames per second (i.e., the rate at which they are rendered by application 102). As shown in this example, display 108 may display synthetic 2D frames 122(1)-(N) in between 2D frames 106(1)-(N) so that together 2D frames 106(1)-(N) and synthetic 2D frames 122(1)-(N) are displayed at 90 frames per second.

In some examples, application 102 may attempt to sequentially render 3D scene 104 to 2D frames 106(1)-(N) at a desired or optimal frame rate. In some examples, application 102 may typically render 3D scene 104 to 2D frames 106(1)-(N) at the desired or optimal frame rate but may periodically render some of 2D frames 106(1)-(N) too slowly to keep up with a desired or optimal frame rate. In these examples, the systems described herein may supplement 2D frames that application 102 is able to render with synthetic frames 122(1)-(N).

FIG. 7 shows an example timing diagram 700 illustrating an exemplary frame rate (i.e., 90 frames per second) by which application 102 may attempt to render 2D frames 106(1)-(N) from 3D scene 104. In this example, display 108 may be capable of displaying 2D frames at 90 frames per second. As shown in FIG. 7, application 102 may fail to render 2D frame 106(3) quickly enough to be displayed at 90 frames per second. However, as shown in this example, display 108 may display synthetic 2D frames 122(1) and 122(2) in between 2D frames 106(2) and 106(4) so that together 2D frames 106 and synthetic 2D frames 122 may be displayed at 90 frames per second.

Figure 8:
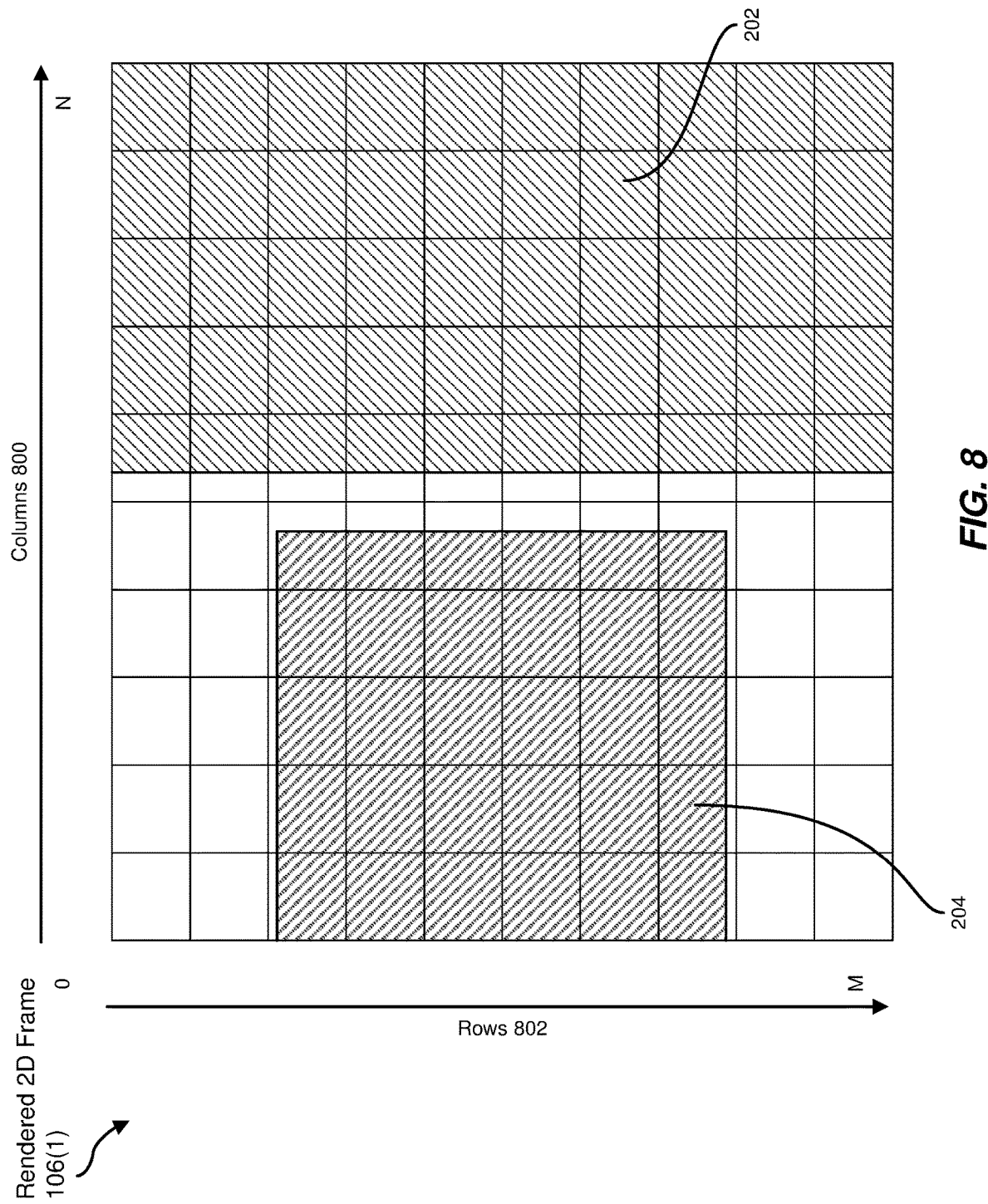
FIG. 8 is a block diagram of an exemplary 2D frame depicting the exemplary 3D scene illustrated in FIGS. 2 and 3 in accordance with some embodiments.
Figure 9:
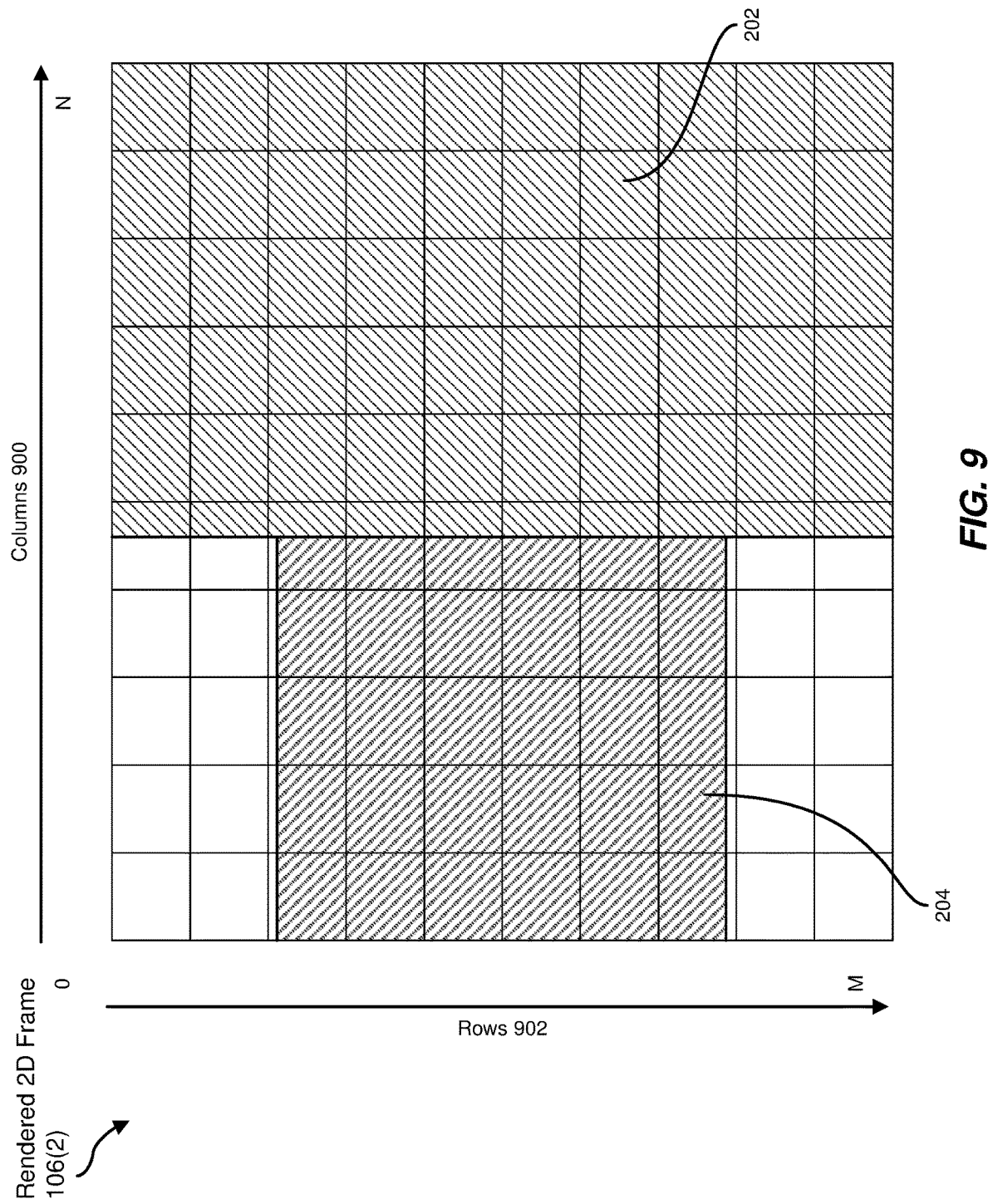
FIG. 9 is a block diagram of an exemplary 2D frame depicting the exemplary 3D scene illustrated in FIGS. 4 and 5 in accordance with some embodiments.

FIGS. 8 and 9 illustrate example 2D frames rendered from 3D scene 104. In some examples, application 102 may render, from perspective 208, 3D scene 104 as shown in FIGS. 2 and 3 to 2D frame 106(1) illustrated in FIG. 8. In this example, 2D frame 106(1) may include columns 800 of pixel elements (e.g., pixels, blocks, or macroblocks), and rows 802 of pixel elements. As seen in FIG. 8, 2D frame 106(1) depicts foreground object 202 and middle-ground object 204 overlapping background object 206 but not each other. At a later time, application 102 may render, from perspective 208, 3D scene 104 as shown in FIGS. 4 and 5 to 2D frame 106(2) as illustrated in FIG. 9. In this example, 2D frame 106(2) may include columns 900 of pixel elements, and rows 902 of pixel elements. As seen in FIG. 9, 2D frame 106(2) depicts foreground object 202 and middle-ground object 204 overlapping background object 206 and foreground object 202 overlapping middle-ground object 204.

Figure 10:
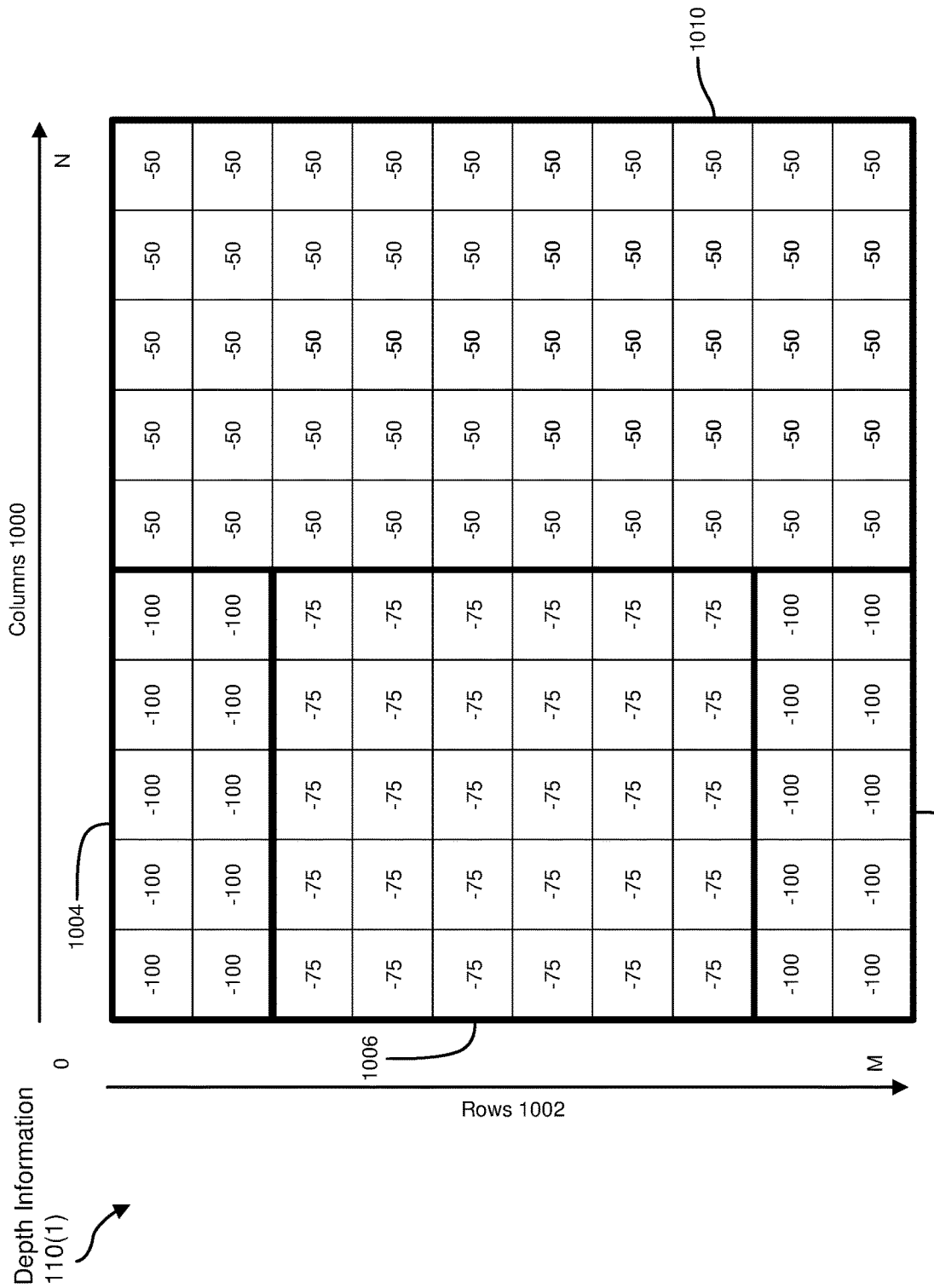
FIG. 10 is a block diagram of exemplary depth information in accordance with some embodiments.

In addition to rendering 2D frames from 3D scene 104, application 102 may also be configured to generate depth information for each 2D frame rendered from 3D scene 104. For example, application 102 may generate depth information 110(1)-(N) corresponding to 2D frames 106(1)-(N), respectively. In some embodiments, the term "depth information" may refer to any measurement of depth of an element in a 3D scene that is mapped to the pixel elements in a 2D frame that depicts the element. Depth information may be represented using any suitable format. In some examples, depth information may be represented using a suitable linear format or a suitable non-linear format. FIG. 10 illustrates exemplary depth information derived from 3D scene 104. In this example, depth information 110(1) may correspond to 2D frame 106(1). As shown, depth information 110(1) may include columns 1000 of elements that each corresponds to one of columns 800, and rows 1002 of elements that each corresponds to one of rows 802. In this example, elements 1004 and 1008 may represent depth measurements of background object 206, elements 1006 may represent depth measurements of middle-ground object 204, and elements 1010 may represent depth measurements of foreground object 202. The depth measurements contained in FIG. 10 are primarily for illustration purposes and are not intended to be exhaustive or to be limited to the precise form shown.

As illustrated in FIG. 1, example system 100 may include one or more modules for displaying 2D frames via display 108. As will be explained in greater detail below, system 100 may include (1) a frame-receiving module 112 that receives 2D frames 106(1)-(N) depicting 3D scene 104, (2) a deriving module 114 that derives 2D motion vectors 116(1)-(N) from 2D frames 106(1)-(N), (3) a depth-information receiving module 118 that receives depth information 110(1)-(N) for evolving 3D scene 104, (4) an extrapolating module 120 that uses 2D frames 106(1)-(N), 2D motion vectors 116(1)-(N), and depth information 110(1)-(N) to extrapolate synthetic 2D frames 122(1)-(N), and (5) a displaying module 124 that displays 2D frames 106(1)-(N) and/or synthetic 2D frames 122(1)-(N) to a user via display 108. Although illustrated as separate elements, one or more of the modules depicted in FIG. 1 may represent portions of a single module or application.

Figure 11:
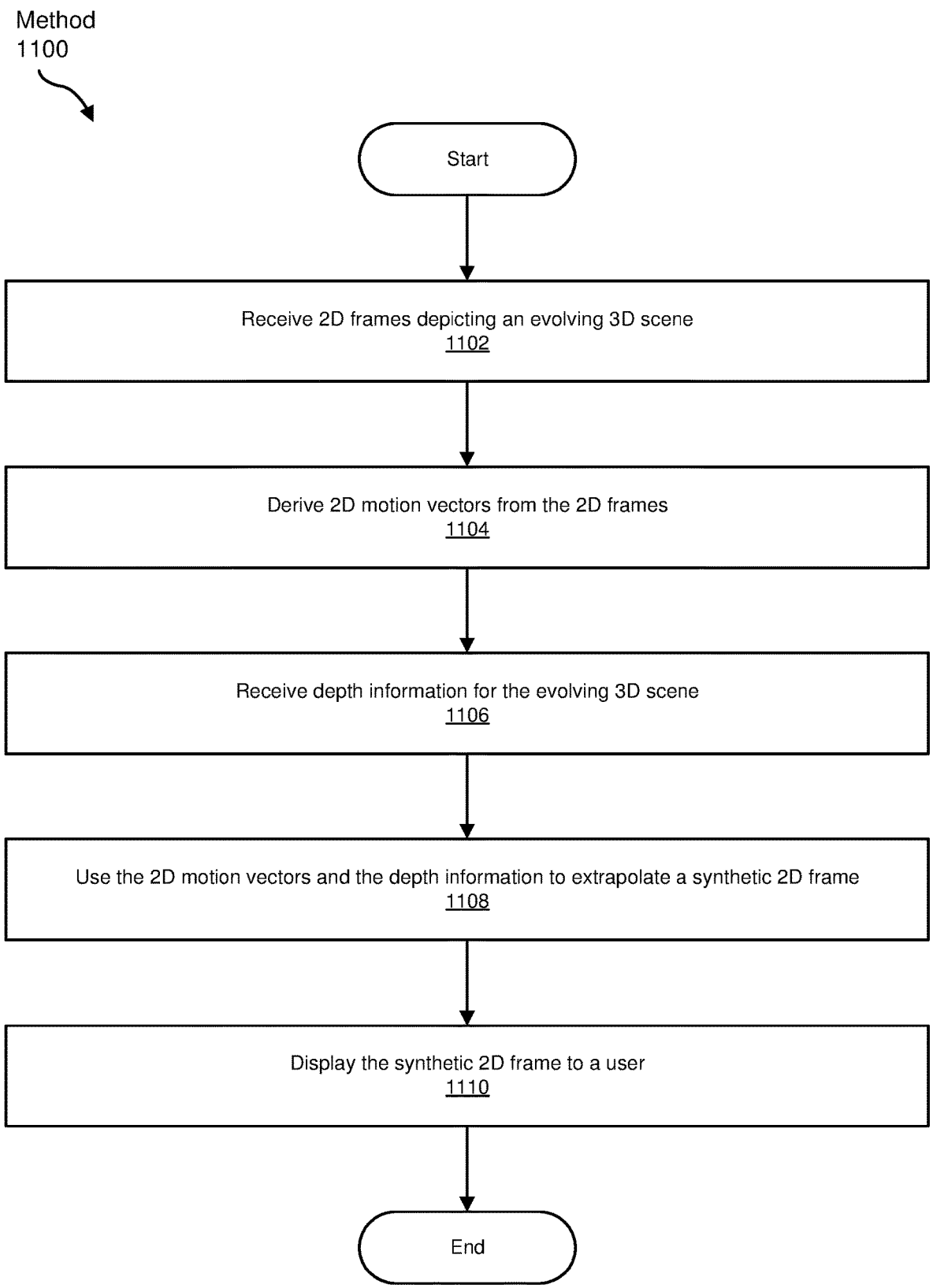
FIG. 11 is a flow diagram of an exemplary method for using depth information to extrapolate 2D frames.

FIG. 11 is a flow diagram of an exemplary computer-implemented method 1100 for using depth information to extrapolate 2D images. The steps shown in FIG. 11 may be performed by any suitable computer-executable code and/or computing system, including the system illustrated in FIG. 1. In one example, each of the steps shown in FIG. 1 may represent an algorithm whose structure includes and/or is represented by multiple sub-steps, examples of which will be provided in greater detail below.

As illustrated in FIG. 11, at step 1102 one or more of the systems described herein may receive 2D frames depicting an evolving 3D scene. For example, frame-receiving module 112 may receive 2D frames 106(1)-(N) depicting 3D scene 104 from application 102. In general, the systems described herein may receive 2D frames 106(1)-(N) depicting 3D scene 104 from application 102 at or below a display's desired or optimal frame rate.

At step 1104, one or more of the systems described herein may derive 2D motion vectors from the 2D frames. For example, deriving module 114 may derive 2D motion vectors 116(1)-(N) from consecutive 2D frames 106(1)-(N). In some embodiments, the term "two-dimensional motion vector" may refer to any estimation of motion between elements of two successive 2D frames in a motion sequence. In some examples, the term "two-dimensional motion vector" may refer to a pixel-level or macroblock-level estimation of motion between pixels or macroblocks of two frames. In some embodiments, the term "two-dimensional motion vector" may refer to an object-level or feature-level estimation of motion between objects or features found in two successive frames in a motion sequence.

Figure 12:
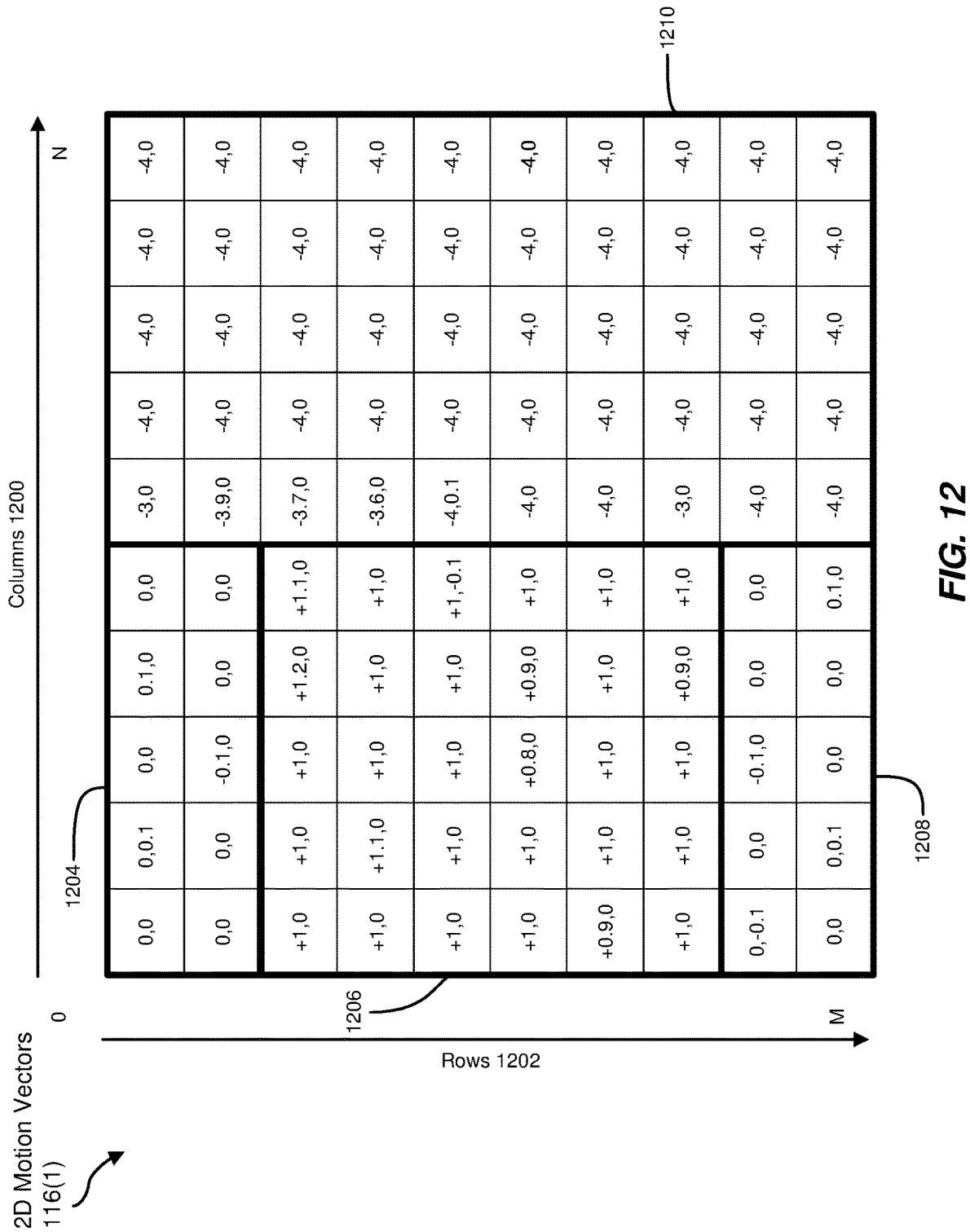
FIG. 12 is a block diagram of exemplary 2D motion vectors in accordance with some embodiments.

FIG. 12 illustrates exemplary 2D motion vectors 116(1) derived from 2D frames 106(1) and 106(2) as illustrated in FIGS. 8 and 9. As depicted in 2D frame 106(1) and 2D frame 106(2), foreground object 202 is moving from right to left, middle-ground object 204 is shown moving from left to right, and background object 206 is shown stationary. 2D motion vectors 116(1) may include motion estimations or measurements for each pixel element of 2D frames 106(1) and 106(2). As shown in FIG. 12, 2D motion vectors 116(1) may include columns 1200 of elements that each corresponds to one of columns 800 or columns 900, and rows 1202 of elements that each corresponds to one of rows 802 or rows 902. In this example, each of elements 1204 and 1208 may contain an estimated motion vector for background object 206, each of elements 1206 may contain an estimated motion vector of middle-ground object 204, and each of elements 1210 may contain an estimated motion vector of foreground object 202. The motion estimates contained in FIG. 12 are primarily for illustration purposes and are not intended to be exhaustive or to be limited to the precise form shown.

The systems described herein may derive 2D motion vectors from 2D frames in a variety of ways. In one example, deriving module 114 may use a hardware motion estimator (e.g., a GPU capable of estimating motion between two frames) to derive 2D motion vectors from 2D frames. For example, deriving module 114 may pass consecutive pairs of 2D frames 106(1)-(N) to hardware motion estimator 126 and may receive a corresponding one of 2D motion vectors 116(1)-(N) containing estimations of motion between the consecutive pairs of 2D frames 106(1)-(N). In general, the systems describe herein may asynchronously derive motion vectors from 2D frames while displaying the 2D frames.

In some situations, some of the motion (e.g., parallax motion) that occurs between consecutive 2D frames rendered from an evolving 3D scene may be caused by a user's translational motion in the physical world. Typically, when a user translationally moves in the physical world, the position of a camera representing the user's point of view may be updated relative to the 3D scene to reflect the user's translational movements. As such, objects in the 3D scene may be rendered by the camera from slightly different points of view, which may result in the objects' positions in consecutive 2D frames to be different even if the objects were not moving relative to the 3D scene. In some examples, 2D motion vectors derived from consecutive 2D frames may capture or represent estimations of motion caused wholly or partially by a user's translational motion. In these examples, the user's translational motion may be accounted for when these 2D motion vectors and one or more of the consecutive 2D frames are used to extrapolate a synthetic 2D frame (as described below).

In some examples, the systems described herein may use various hardware sensors (e.g., stationary room sensors and/or body-attached sensors) to accurately measure a user's translational motion in the physical world. While estimated 2D motion vectors may be used to account for the effects of the user's translational motion when extrapolating 2D frames, extrapolating 2D frames based on a sensor's measurements of the user's translational motion may be a more accurate way of accounting for this motion. As such, the systems described herein may use a sensor's measurements of a user's translational motion to positionally reproject (e.g., positionally warping) pixel elements of rendered 2D frames to account for this motion before using the positionally reprojected 2D frames to derive 2D motion vectors that account for other motion. In some examples, by positionally reprojecting pixel elements of a 2D frame to account for a user's translational motion, the systems described herein may effectively filter out motion effects of the user's translational motion from the 2D frame.

In one example, the systems described herein may reproject pixel elements of a 2D frame to account for a user's translational motion by first using depth information to positionally project pixel elements of a 2D frame to a 3D space (e.g., projecting pixel elements of the 2D frame from a screen space to a camera space or a world space). In some examples, the systems described herein may use an inverse projection matrix or a heightmap to positionally project pixel elements of a 2D frame to a 3D space. Next, the systems described herein may adjust the 3D projection to account for the user's translational motion (e.g., by moving points of the 3D projection in camera space to reflect the user's translational motion). Finally, the systems described herein may reproject the adjusted 3D projection back to a 2D frame (e.g., using a projection matrix).

Figure 13:
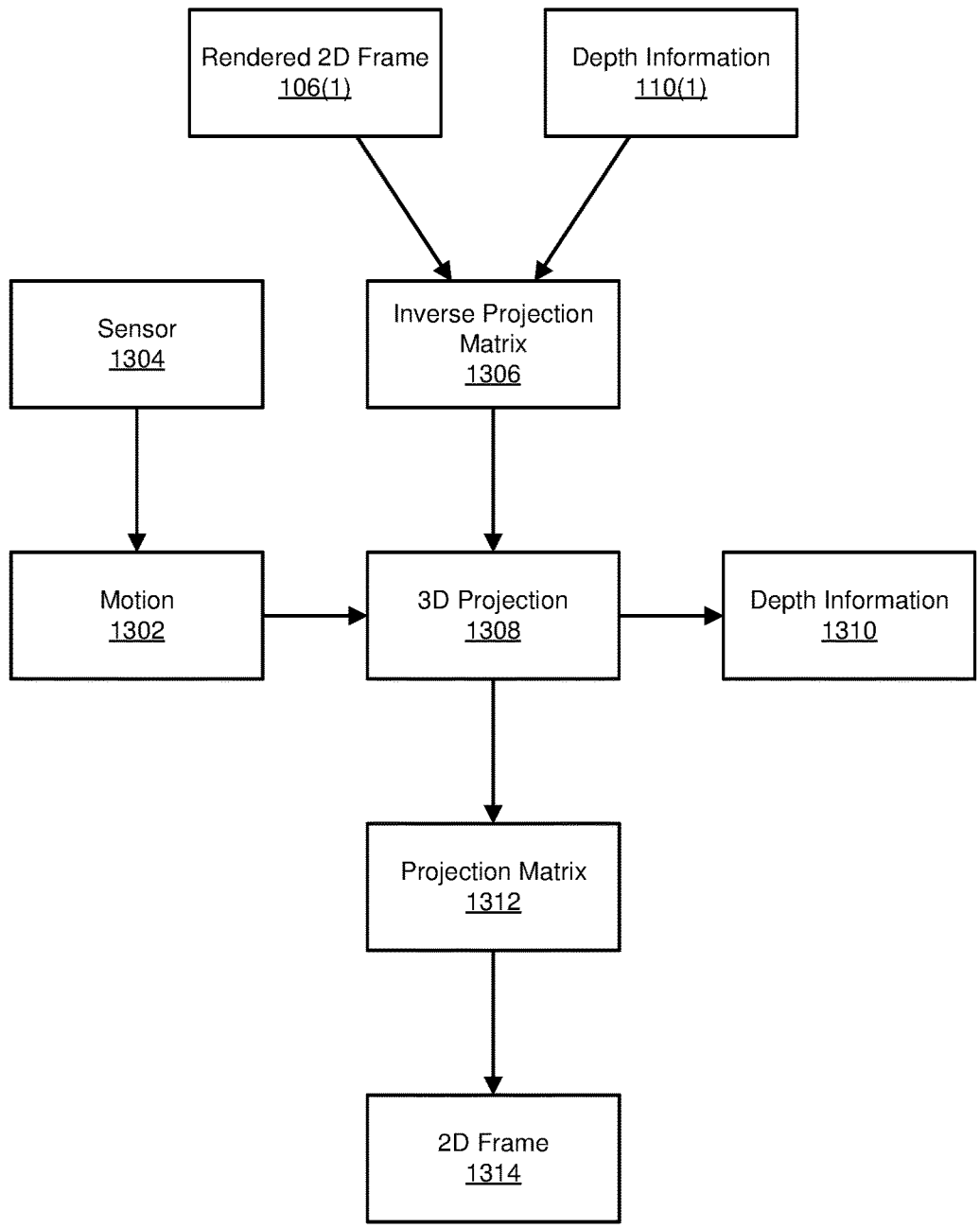
FIG. 13 is a flow diagram of an exemplary data flow for using depth information to positionally reproject rendered 2D frames in accordance with some embodiments.

FIG. 13 illustrates an exemplary data flow 1300 for using depth information 110(1) to positionally reproject rendered 2D frame 106(1) based on a user's physical-world translational motion 1302 tracked by a motion sensor 1304. In this example, the systems described herein may use an inverse projection matrix 1306 and depth information 110(1) to positionally project pixel elements of rendered 2D frame 106(1) to a camera space as 3D projection 1308. The systems described herein may then adjust 3D projection 1308 to account for motion 1302 (e.g., by transforming points of 3D projection 1308 in the camera space to reflect motion 1302). In some examples, the adjustment of 3D projection 1308 may result in new depth information 1310. Finally, the systems described herein may use a projection matrix 1312 to reproject 3D projection 1308 back to a 2D frame 1314. In some examples, the systems and methods described herein may use 2D frame 1314 in place of rendered 2D frame 106(1) and/or may use depth information 1310 in place of depth information 110(1).

At step 1106, one or more of the systems described herein may receive depth information for the evolving 3D scene. For example, depth-information receiving module 118 may receive depth information 110(1)-(N) for 3D scene 104 from application 102.

At step 1108, one or more of the systems described herein may use the 2D motion vectors and the depth information to extrapolate a synthetic 2D frame. For example, extrapolating module 120 may use 2D motion vectors 116(1)-(N) and depth information 110(1)-(N) to extrapolate synthetic frames 122(1)-(N). In general, the systems describe herein may asynchronously extrapolate synthetic 2D frames while receiving and displaying rendered 2D frames.

The systems described herein may use 2D motion vectors and depth information to extrapolate a synthetic 2D frame in a variety of ways. In general, extrapolating module 120 may use 2D or 3D motion vectors to extrapolate a synthetic 2D frame from a rendered 2D frame by warping (e.g., distorting, transforming, or remapping) pixel elements of the rendered 2D frame according to their associated motion vectors. Since motion vectors associated with a pixel element of a 2D frame rendered from a 3D scene at a prior time may predict where the pixel element is expected to be at a subsequent time, the systems describe herein may use the motion vectors associated with the pixel elements of the 2D frame to predict where the pixel elements are expected to be at the subsequent time and remap the pixel elements of the 2D frame accordingly to extrapolate a new synthetic 2D frame.

Figure 15:
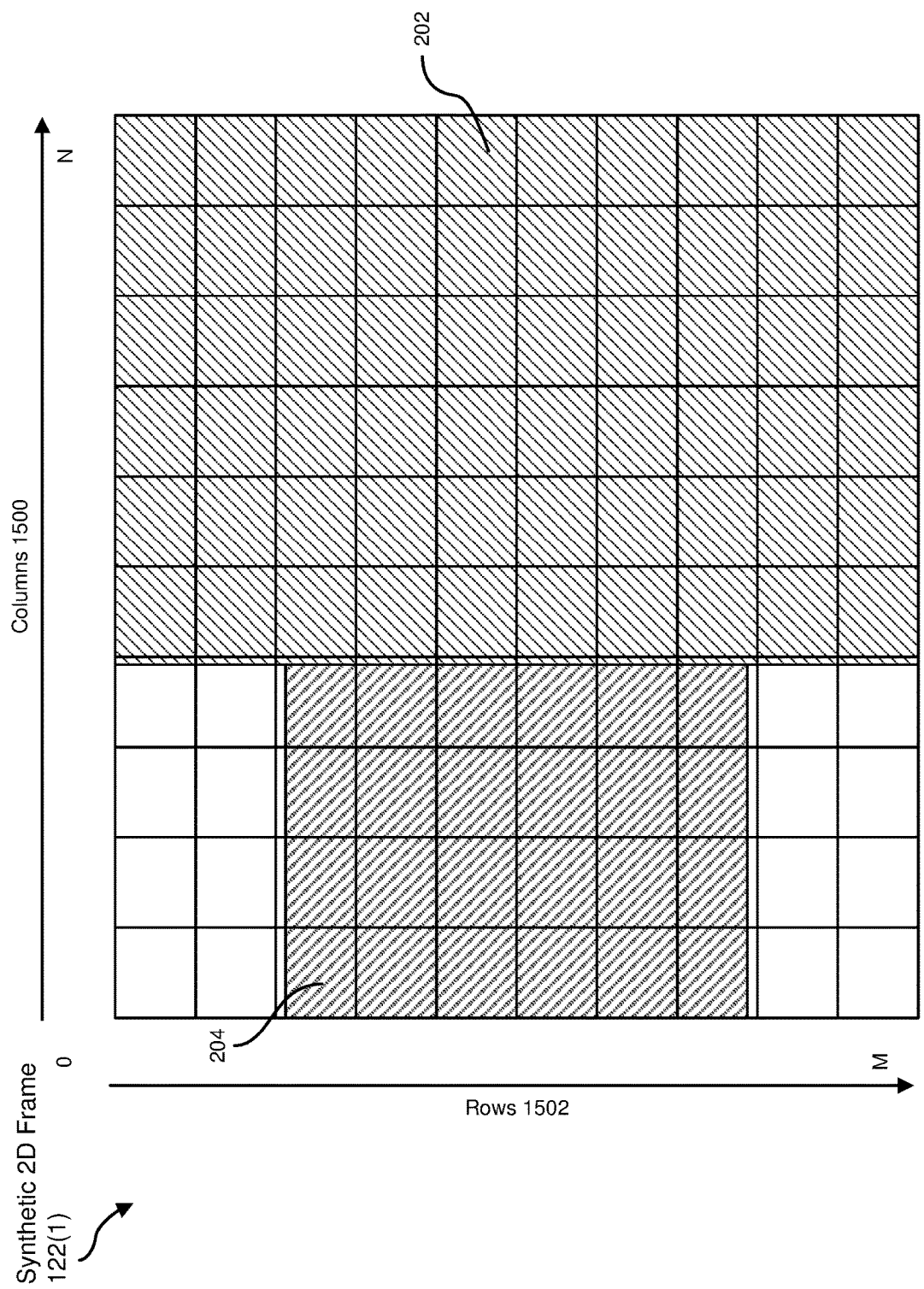
FIG. 15 is a block diagram of an exemplary 2D synthetic frame in accordance with some embodiments.

Using FIGS. 9, 12, and 15 as an example, extrapolating module 120 may extrapolate synthetic 2D frame 122(1) in FIG. 15 from 2D frame 106(2) in FIG. 9 by warping pixel elements of 2D frame 106(2) according to their associated motion vectors. As shown in FIG. 15, synthetic 2D frame 122(1) may include columns 1500 of pixel elements that each corresponds to one of columns 900, and rows 1502 of pixel elements that each corresponds to one of rows 902. In this example, motion vectors 1204 and 1208 may indicate that the pixel elements in 2D frame 106(2) corresponding to background object 206 should remain stationary and should not be warped or remapped, motion vectors 1206 may indicate that the pixel elements in 2D frame 106(2) corresponding to middle-ground object 204 should be warped or remapped to the right, and motion vectors 1210 may indicate that the pixel elements in 2D frame 106(2) corresponding to foreground object 202 should be warped or remapped to the left.

In one example, estimated 2D motion vectors may contain unwanted noise, and extrapolating module 120 may use a noise-reducing filter 121 (e.g., a median filter or a center-weighted median filter) to remove the noise from the estimated 2D motion vectors prior to using the 2D motion vectors to warp a 2D frame. In some examples, the systems described herein may use depth information to derive filter weights such that an element's filtered value is affected more by neighbor elements that are at the same or similar depth and less by neighboring elements that are not at the same or similar depth. Using depth information to weight a noise-reducing filter may improve the accuracy of filtered motion vectors since motion vectors at the same depth are likely to be associated with the same 3D object and motion vectors not at the same depth are not likely to be associated with the same 3D object.

Figure 14:
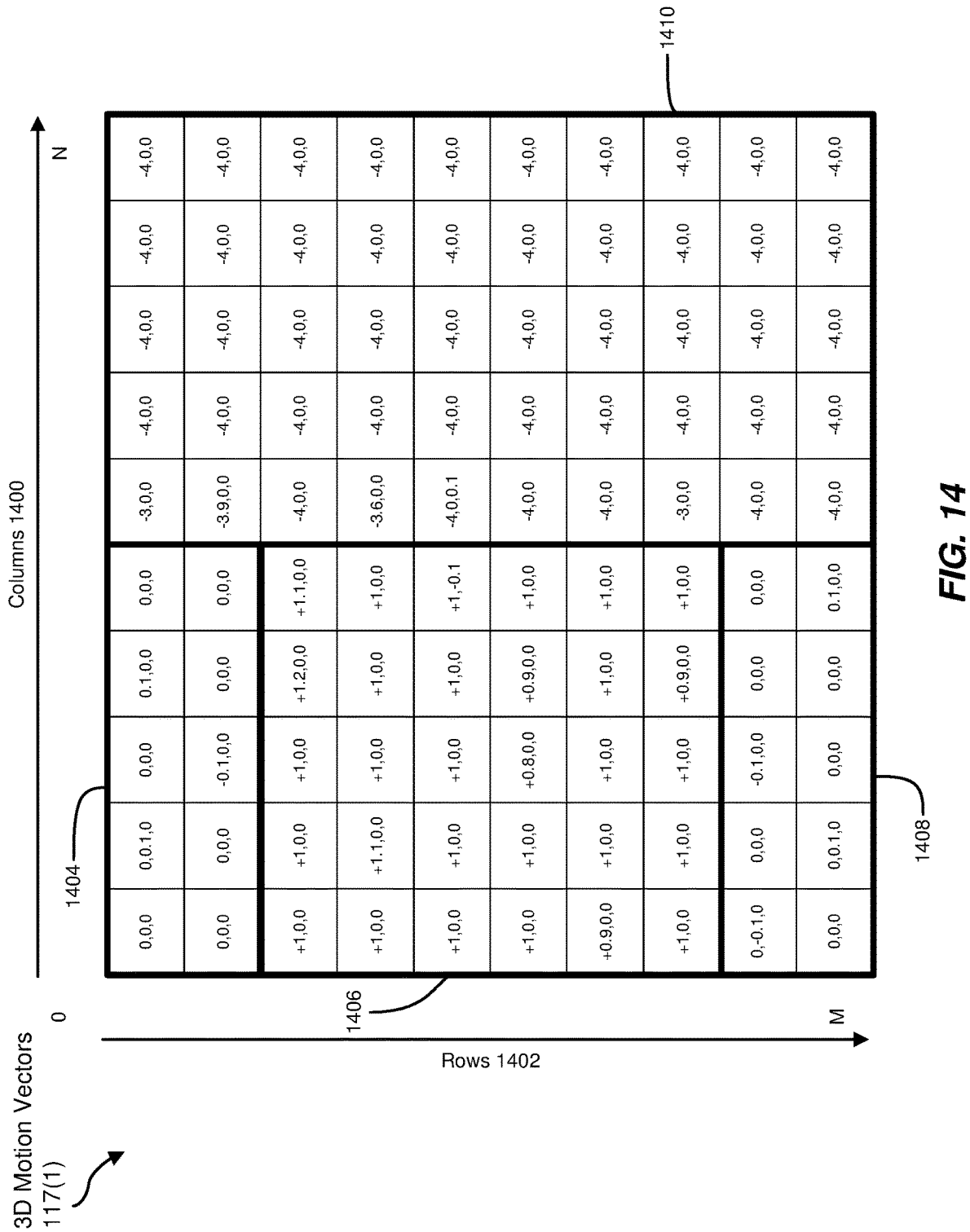
FIG. 14 is a block diagram of exemplary 3D motion vectors in accordance with some embodiments.

In some examples, the systems described herein may use depth information to convert 2D motion vectors into 3D motion vectors and then use the 3D motion vectors to extrapolate a synthetic 2D frame. In some examples, the systems described herein may compare the depth information associated with the two 2D frames from which 2D motion vectors were derived to determine a depth component to motion estimates. These depth components may be combined with 2D motion vectors to generate 3D motion vectors that may be used to extrapolate synthetic 2D frames. FIG. 14 illustrates exemplary 3D motion vectors 117(1) derived from depth information 110(1) and 110(2) and 2D motion vectors 116(1). 3D motion vectors 117(1) may include motion estimations or measurements for each pixel element of 2D frames 106(1) and 106(2). As shown in FIG. 14, 3D motion vectors 117(1) may include columns 1400 of elements that each corresponds to one of columns 800 or columns 900, and rows 1402 of elements that each corresponds to one of rows 802 or rows 902. In this example, each of elements 1404 and 1408 may contain an estimated 3D motion vector for background object 206, each of elements 1406 may contain an estimated 3D motion vector of middle-ground object 204, and each of elements 1410 may contain an estimated 3D motion vector of foreground object 202. The motion estimates contained in FIG. 14 are primarily for illustration purposes and are not intended to be exhaustive or to be limited to the precise form shown.

In some examples, the systems described herein may use 3D motion vectors to extrapolate synthetic 2D frames by (1) projecting the 3D motion vectors to 2D motion vectors and (2) using the projected 2D motion vectors to extrapolate a synthetic 2D frame (e.g., using the methods described above). Before projecting 3D motion vectors to 2D motion vectors, the systems described herein may perform one or more operations on the 3D motion vectors. For example, before projecting 3D motion vectors to 2D motion vectors, the systems described herein may remove noise from the 3D motion vectors (e.g., by applying a suitable weighted filter to the plurality of 3D motion vectors).

As illustrated in FIG. 11, at step 1110 one or more of the systems described herein may display the synthetic 2D frame to a user. For example, displaying module 124 may display some or all of synthetic frames 122(1)-(N) to a user via display 108.

The systems described herein may perform step 1110 in a variety of ways. In some examples, the systems and methods described herein may display synthetic 2D frames whenever an application renders a 3D scene at a frame rate that is lower than a display's desired or optimal frame rate. For example, as shown in FIG. 6, application 102 may render 2D frames 106(1)-(N) at 45 frames per second, and display 108 may display synthetic 2D frames 122(1)-(N) in between 2D frames 106(1)-(N) so that together 2D frames 106(1)-(N) and synthetic 2D frames 122(1)-(N) are displayed at 90 frames per second. In another example, as shown in FIG. 7, application 102 may fail to render 2D frame 106(3) quickly enough to be displayed at 90 frames per second. However, as shown in this example, display 108 may display synthetic 2D frames 122(1) and 122(2) in between 2D frames 106(2) and 106(4) so that together 2D frames 106 and synthetic 2D frames 122 may be displayed at 90 frames per second. In some examples, when an application fails to submit frames at a desired or optimal frame rate, the systems describe herein may instruct or cause the application to reduce its rendering frame rate (e.g., to half the desired or optimal frame rate) and may provide intermediate frames using extrapolated synthetic 2D frames.

As explained above, embodiments of the instant disclosure may use depth information from an evolving 3D scene and estimations of motion from 2D frames rendered from the 3D scene to extrapolate supplemental synthetic 2D frames. In some examples, the systems and methods described herein may display these supplemental synthetic 2D frames whenever a VR or AR application renders a 3D scene at a frame rate that is lower than a display's desired or optimal frame rate, which may ensure that VR or AR experiences remain smooth and enjoyable for users. Additionally or alternatively, the systems and methods described herein may display supplemental synthetic 2D frames for a VR or AR application running on hardware that is unable to render 2D frames at a display's desired or optimal frame rate, which may improve VR or AR experiences on lower performance hardware that was previously unable to drive enjoyable VR or AR experiences. In at least one example, by displaying a synthetic 2D frame for every 2D frame rendered by a VR or AR application, the systems and methods described herein may enable the VR or AR application to render 2D frames at half of a display's desired or optimal frame rate, which may halve the central processing unit (CPU) and/or a graphical processing unit (GPU) time required to produce the same number of 2D frames from a 3D scene.

In some examples, the systems and methods described herein may examine two previous 2D frames for animations, camera translations, head translations, etc. to predict a subsequent 2D frame. The systems and methods described herein may represent animations, camera translations, head translations, etc. as 2D motion vectors, which may in some situations be noisy. Prior to using 2D motion vectors to generate extrapolated 2D frames, the systems and methods described herein may apply a weighted filter whose weights are derived from depth information to the 2D motion vectors, which may reduce noise found in the 2D motion vectors and thus improve the quality of extrapolated 2D frames generated from the 2D motion vectors. In some examples, the systems and methods may use depth information to transform 2D motion vectors into 3D motion vectors, which may be used instead of the 2D motion vectors to generate extrapolated 2D frames.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive two 2D frames rendered from an evolving 3D scene and depth information for the 3D scene, transform the two 2D frames into 2D motion vectors, output a result of the transformation to a system that extrapolates a synthetic 2D frame from the 2D frames, the 2D motion vectors, and the depth information for the 3D scene, use the result of the transformation to extrapolate a synthetic 2D frame from the 2D frames, the 2D motion vectors, and the depth information for the 3D scene, and display the synthetic 2D frame to a user. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving a two-dimensional frame derived from a three-dimensional scene having a plurality of virtual elements, the two-dimensional frame depicting a user's perspective of the three-dimensional scene;
   displaying the two-dimensional frame to the user;
   estimating a motion of at least one of:
      one or more of the plurality of virtual elements; or
      the user's perspective of the three-dimensional scene;
   receiving depth information for the three-dimensional scene;
   extrapolating, based on the motion and the depth information, a synthetic two-dimensional frame from the two-dimensional frame; and
   displaying the synthetic two-dimensional frame to the user.

2. The computer-implemented method of claim 1 further comprising receiving an additional two-dimensional frame depicting the three-dimensional scene, the additional two-dimensional frame depicting the plurality of virtual elements, wherein estimating the motion comprises deriving a plurality of two-dimensional motion vectors from the two-dimensional frame and the additional two-dimensional frame, each of the plurality of two-dimensional motion vectors comprising an estimated offset from coordinates of an element in the two-dimensional frame to coordinates of the element in the additional two-dimensional frame.

3. The computer-implemented method of claim 2, wherein:
the two-dimensional frame and the additional two-dimensional frame are sequentially rendered from the three-dimensional scene at half a desired frame rate;
the two-dimensional frame and the additional two-dimensional frame are sequentially displayed to the user at half the desired frame rate; and
displaying the synthetic two-dimensional frame comprises displaying the synthetic two-dimensional frame at the desired frame rate.

4. The computer-implemented method of claim 2, wherein:
the two-dimensional frame, the additional two-dimensional frame, and a third two-dimensional frame are sequentially rendered from the three-dimensional scene;
the two-dimensional frame and the additional two-dimensional frame are sequentially displayed to the user at a desired frame rate; and
displaying the synthetic two-dimensional frame comprises:
determining that the third two-dimensional frame failed to render in time to be displayed to the user at the desired frame rate; and
displaying, at the desired frame rate, the synthetic two-dimensional frame in place of the third two-dimensional frame.

5. The computer-implemented method of claim 2, wherein:
extrapolating the synthetic two-dimensional frame from the two-dimensional frame comprises removing noise from the plurality of two-dimensional motion vectors by applying a weighted filter to the plurality of two-dimensional motion vectors; and
the depth information is used to derive weights of the weighted filter.

6. The computer-implemented method of claim 5, wherein the weighted filter is a center-weighted median filter.

7. The computer-implemented method of claim 2, wherein extrapolating the synthetic two-dimensional frame from the two-dimensional frame comprises:
using the depth information to convert the plurality of two-dimensional motion vectors into a plurality of three-dimensional motion vectors; and
using the plurality of three-dimensional motion vectors to extrapolate the synthetic two-dimensional frame.

8. The computer-implemented method of claim 2, wherein deriving the plurality of two-dimensional motion vectors from the two-dimensional frame and the additional two-dimensional frame comprises:
sending, as input to a hardware motion estimator, the two-dimensional frame and the additional two-dimensional frame; and
receiving, as output from the hardware motion estimator, the plurality of two-dimensional motion vectors.

9. The computer-implemented method of claim 2, wherein:
the two-dimensional frame, the additional two-dimensional frame, and the depth information are received by a head-mounted display device from a virtual-reality application or an augmented-reality application; and
the head-mounted display device displays the two-dimensional frame, estimates the motion, extrapolates the synthetic two-dimensional frame, and displays the synthetic two-dimensional frame.

10. The computer-implemented method of claim 2, wherein extrapolating the synthetic two-dimensional frame from the two-dimensional frame comprises deriving the synthetic two-dimensional frame from the additional two-dimensional frame by warping the additional two-dimensional frame based at least in part on the plurality of two-dimensional motion vectors and the depth information.

11. The computer-implemented method of claim 2 further comprising:
tracking the user's translational motion in the physical world; and
using the depth information to reproject, before deriving the plurality of two-dimensional motion vectors, pixel elements of the additional two-dimensional frame to account for the user's translational motion.

12. The computer-implemented method of claim 1, wherein extrapolating the synthetic two-dimensional frame from the two-dimensional frame comprises:
tracking the user's translational motion in the physical world;
using an inverse projection matrix and the depth information to positionally project pixel elements of the two-dimensional frame to a camera space as a three-dimensional projection;
generating additional depth information by transforming points of the three-dimensional projection in the camera space to reflect the user's translational motion;
using a projection matrix to reproject the three-dimensional projection to an additional two-dimensional frame; and
using at least one of the additional depth information or the additional two-dimensional frame to extrapolate the synthetic two-dimensional frame.

13. A system comprising:
a frame-receiving module, stored in memory, that receives a two-dimensional frame derived from a three-dimensional scene having a plurality of virtual elements, the two-dimensional frame depicting a user's perspective of the three-dimensional scene;
a displaying module, stored in memory, that displays the two-dimensional frame to the user;
a deriving module, stored in memory, that estimates a motion of at least one of:
one or more of the plurality of virtual elements; or
the user's perspective of the three-dimensional scene;
a depth-information receiving module, stored in memory, that receives depth information for the three-dimensional scene;
an extrapolating module, stored in memory, that extrapolates, based on the motion and the depth information, a synthetic two-dimensional frame from the two-dimensional frame, wherein the displaying module further displays the synthetic two-dimensional frame to the user; and
at least one processor that executes the frame-receiving module, the deriving module, the depth-information receiving module, the extrapolating module, and the displaying module.

14. The system of claim 13, wherein:
the frame-receiving module further receives an additional two-dimensional frame depicting the three-dimensional scene, the additional two-dimensional frame depicting the plurality of virtual elements;

the deriving module estimates the motion by deriving a plurality of two-dimensional motion vectors from the two-dimensional frame and the additional two-dimensional frame, each of the plurality of two-dimensional motion vectors comprising an estimated offset from coordinates of an element in the two-dimensional frame to coordinates of the element in the additional two-dimensional frame.

15. The system of claim 14, wherein:
the two-dimensional frame and the additional two-dimensional frame are sequentially rendered from the three-dimensional scene at half a desired frame rate;
the two-dimensional frame and the additional two-dimensional frame are sequentially displayed to the user at half the desired frame rate; and
the displaying module displays the synthetic two-dimensional frame at the desired frame rate.

16. The system of claim 14, wherein:
the two-dimensional frame, the additional two-dimensional frame, and a third two-dimensional frame are sequentially rendered from the three-dimensional scene;
the displaying module further sequentially displays the two-dimensional frame and the additional two-dimensional frame to the user at a desired frame rate; and
the displaying module displays the synthetic two-dimensional frame by:
    determining that the third two-dimensional frame failed to render in time to be displayed to the user at the desired frame rate; and
    displaying, at the desired frame rate, the synthetic two-dimensional frame in place of the third two-dimensional frame.

17. The system of claim 14, wherein:
the extrapolating module extrapolates the synthetic two-dimensional frame from the two-dimensional frame by removing noise from the plurality of two-dimensional motion vectors by applying a weighted filter to the plurality of two-dimensional motion vectors; and
the depth information is used to derive weights of the weighted filter.

18. The system of claim 14, wherein the extrapolating module extrapolates the synthetic two-dimensional frame from the two-dimensional frame by:
    using the depth information to convert the plurality of two-dimensional motion vectors into a plurality of three-dimensional motion vectors; and
    using the plurality of three-dimensional motion vectors to extrapolate the synthetic two-dimensional frame.

19. The system of claim 14, wherein the deriving module derives the plurality of two-dimensional motion vectors from the two-dimensional frame and the additional two-dimensional frame by:
    sending, as input to a hardware motion estimator, the two-dimensional frame and the additional two-dimensional frame; and
    receiving, as output from the hardware motion estimator, the plurality of two-dimensional motion vectors.

20. A non-transitory computer-readable medium comprising computer-readable instructions that, when executed by at least one processor of a computing device, cause the computing device to:
    receive a two-dimensional frame derived from a three-dimensional scene having a plurality of virtual elements, the two-dimensional frame depicting a user's perspective of the three-dimensional scene;
    display the two-dimensional frame to the user;
    estimate a motion of at least one of:
        one or more of the plurality of virtual elements; or
        the user's perspective of the three-dimensional scene;
    receive depth information for the three-dimensional scene;
    extrapolate, based on the motion and the depth information, a synthetic two-dimensional frame from the two-dimensional frame; and
    display the synthetic two-dimensional frame to the user.

* * * * *